(12) United States Patent
Kim et al.

(10) Patent No.: US 7,998,638 B2
(45) Date of Patent: Aug. 16, 2011

(54) ELECTRODE FOR FUEL CELL, AND MEMBRANE-ELECTRODE ASSEMBLY AND FUEL CELL SYSTEM COMPRISING THE SAME

(75) Inventors: Hee-Tak Kim, Suwon-si (KR); Jong-Ki Lee, Suwon-si (KR); Jan-Dee Kim, Suwon-si (KR); Hae-Kwon Yoon, Suwon-si (KR); Ho-Jin Kweon, Suwon-si (KR); Young-Mi Park, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1493 days.

(21) Appl. No.: 11/264,745

(22) Filed: Nov. 2, 2005

(65) Prior Publication Data

US 2006/0105227 A1    May 18, 2006

(30) Foreign Application Priority Data

Nov. 3, 2004 (KR) .................. 10-2004-0088706
Jan. 26, 2005 (KR) .................. 10-2005-0007306
Jan. 26, 2005 (KR) .................. 10-2005-0007307

(51) Int. Cl.
*H01M 4/86* (2006.01)
*H01M 4/88* (2006.01)
*H01M 8/02* (2006.01)

(52) U.S. Cl. ........ 429/530; 429/492; 429/529; 429/535; 427/115

(58) Field of Classification Search .................. None
See application file for complete search history.

(56) References Cited

U.S. PATENT DOCUMENTS

| | | | |
|---|---|---|---|
| 4,181,776 | A | 1/1980 | Lindstrom |
| 6,024,848 | A | 2/2000 | Dufner et al. |
| 6,083,638 | A | 7/2000 | Taniguchi et al. |
| 2001/0004501 | A1 | 6/2001 | Yi et al. |
| 2003/0068544 | A1 | 4/2003 | Cisar et al. |
| 2004/0038808 | A1 | 2/2004 | Hampden-Smith et al. |
| 2004/0191605 | A1 | 9/2004 | Kinkelaar et al. |
| 2004/0209153 | A1 | 10/2004 | Peled et al. |
| 2006/0105227 | A1* | 5/2006 | Kim et al. ........... 429/44 |

FOREIGN PATENT DOCUMENTS

| | | |
|---|---|---|
| EP | 0 872 907 | 10/1998 |
| JP | 03-182052 A | 8/1991 |

(Continued)

OTHER PUBLICATIONS

European Office Action of the European Patent Application No. 05 11 0283, mailed on Mar. 10, 2006.

(Continued)

*Primary Examiner* — John S Maples
(74) *Attorney, Agent, or Firm* — Robert E. Bushnell, Esq.

(57) ABSTRACT

The electrode for a fuel cell of the present invention includes a catalyst layer and an electrode substrate supporting the catalyst layer, where the electrode substrate includes a hydrophilic region and a hydrophobic region separated from each other. The hydrophilic region and the hydrophobic region that are separated from each other can easily release water produced at the cathode, and thereby prevent clogging of pores of the membrane by water, and smoothly diffuse the reactants resulting in obtaining a high current density.

36 Claims, 11 Drawing Sheets

FOREIGN PATENT DOCUMENTS

| | | |
|---|---|---|
| JP | 06-103983 A | 4/1994 |
| JP | 07-134992 A | 5/1995 |
| JP | 07-134993 | 5/1995 |
| JP | 07-211325 | 8/1995 |
| JP | 11-511289 A | 9/1999 |
| JP | 2002-298859 A | 10/2002 |
| JP | 2003-59498 * | 2/2003 |
| JP | 2003-059498 | 2/2003 |
| JP | 2003-151565 A | 5/2003 |
| JP | 2005-093167 A | 4/2005 |
| JP | 2008-509521 A | 3/2008 |
| KR | 10-2004-0045416 | 6/2004 |

OTHER PUBLICATIONS

European Search Report issued by European Patent Office on Nov. 19, 2010 corresponding to Korean Patent Application No. 2004-0088706, 2005-0007306, and 2005-0007307.

Chinese Office Action issued by Chinese Patent Office on Jan. 26, 2011 corresponding to KR2004-0088706, KR2005-0007306, and KR2005-0007307 with English translation attached.

European Office Action issued by EPO, dated Mar. 7, 2011, corresponding to European Patent Application No. 05 110 283.8-1227.

Chinese Office Action issued by SIPO, dated May 11, 2011, corresponding to Chinese Patent Application 200810178017.0, together with English translation.

* cited by examiner

ELECTRODE FOR FUEL CELL, AND MEMBRANE-ELECTRODE ASSEMBLY AND FUEL CELL SYSTEM COMPRISING THE SAME

CLAIM OF PRIORITY

This application makes reference to, incorporates the same herein, and claims all benefits accruing under 35 U.S.C. §119 from applications for MEMBRANE/ELECTRODE ASSEMBLY FOR FUEL CELL AND FUEL CELL SYSTEM COMPRISING SAME earlier filed in the Korean Intellectual Property Office on 3 Nov. 2004 and there duly assigned Serial No. 10-2004-0088706, for ELECTRODE FOR FUEL CELL, AND A FUEL CELL COMPRISING THE SAME earlier filed in the Korean Intellectual Property Office on 26 Jan. 2005 and there duly assigned Serial No. 10-2005-0007306, and for ELECTRODE FOR FUEL CELL, AND MEMBRANE-ELECTRODE ASSEMBLY AND FUEL CELL SYSTEM COMPRISING THE SAME earlier filed in the Korean Intellectual Property Office on 26 Jan. 2005 and there duly assigned Serial No. 10-2005-0007307, respectively.

BACKGROUND OF THE INVENTION

1. Field of the Invention

The present invention relates to an electrode for a fuel cell and a membrane-electrode assembly and a fuel cell system including the same. More particularly, the present invention relates to an electrode which is capable of maintaining moisture hygroscopicity of a polymer electrolyte membrane at a predetermined level, releasing water produced at a cathode, thereby, preventing clogging of pores of the membrane by water, and improving a current density at high rate.

2. Description of Related Art

A fuel cell is a power generation system for producing electrical energy through an electrochemical redox reaction of an oxidant and a fuel, such as hydrogen, or a hydrocarbon-based material, such as methanol, ethanol, natural gas, or the like.

The fuel cell can be classified as a phosphoric acid type, a molten carbonate type, a solid oxide type, a polymer electrolyte type, or an alkaline type of fuel cell depending upon the kind of electrolyte used. Although each fuel cell basically operates in accordance with the same principles, the kind of fuel, the operating temperature, the catalyst, and the electrolyte may be selected depending upon the type of cell.

Recently, polymer electrolyte membrane fuel cells (PEMFCs) have been developed. They have power characteristics that are superior to conventional fuel cells, as well as lower operating temperatures, and faster start and response characteristics. Because of this, PEMFCs have a wide range of applications, such as for transportable power sources for automobiles, distributed power sources for residences and public buildings, and small power sources for electronic devices.

Such a fuel cell system includes a stack which substantially generates electricity, the stack including at least one electricity generating element.

The stack for generating the electricity has a structure in which several unit cells, each having a membrane-electrode assembly (MEA) and separators (also referred to as "bipolar plates"), are stacked adjacent to one another in series. The MEA is composed of an anode (referred to also as a "fuel electrode" or an "oxidation electrode") and a cathode (referred to also as an "air electrode" or a "reduction electrode") that are separated by a polymer electrolyte membrane. The anode and cathode are composed of a catalyst layer contacting a polymer electrolyte membrane and a gas diffusion layer (GDL) contacting the catalyst layer. Each separator includes a gas flow path for supplying a fuel to the anode and an oxidant to the cathode. Separators positioned at the outermost ends of the stack are end plates.

The separators function both as channels for supplying the fuel and the oxidant required for a reaction to the anode and the cathode, as well as conductors for serially connecting the cathode and the anode in each MEA and connecting the cathode of one MEA to the anode of a neighboring MEA.

Hydrogen or a fuel is supplied to the anode and an oxidant is supplied to the cathode through the separators. The electrochemical oxidation reaction of the fuel occurs at the anode and the electrochemical reduction reaction of the oxygen occurs at the cathode, and as a result of the transfer of the electrons generated by the oxidation/reduction reactions, electrical energy, heat, and moisture are produced. The reaction is as follows.

At the anode: 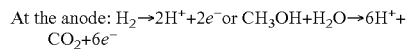

At the cathode: 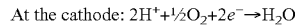

In this reaction scheme, water is produced in the cathode reaction. More water is relatively produced at the oxidant inlet of a separator because there is a higher reaction rate in that region. The produced water should immediately be removed through an outlet. If not, pressure of the oxidant supplied through the separator increases, as does the hygroscopicity of the polymer electrolyte membrane of the membrane-electrode assembly.

Generally, as hygroscopicity of a polymer electrolyte membrane increases, proton conductivity increases. Thus, a polymer electrolyte membrane has to include moisture at a predetermined level. However, excessive moisture may induce clogging of the gas flow of the gas diffusion layer or the separator, and gas diffusion is thereby reduced resulting in deterioration of cell performance. Therefore, in order to manufacture a fuel cell with high performance, a polymer electrolyte membrane should remove an excess amount of moisture safely and rapidly while maintaining a suitable hygroscopic state.

SUMMARY OF THE INVENTION

An exemplary embodiment of the present invention provides an electrode for a fuel cell which is capable of maintaining moisture hygroscopicity of a polymer electrolyte membrane at a predetermined level, releasing water produced at a cathode thereby preventing clogging of pores of the membrane by water, and improving a current density at high rate. Another embodiment of the present invention provides a membrane-electrode assembly for a fuel cell, including the electrode. Yet another embodiment of the present invention provides a fuel cell system including the electrode.

According to a first embodiment of the present invention, an electrode for a fuel cell is provided which includes a catalyst layer and an electrode substrate supporting the catalyst layer. The electrode substrate includes a hydrophilic region and a hydrophobic region separated from each other.

The electrode substrate may include a hydrophobic polymer which is present at a concentration gradient.

The hydrophobic polymer has a concentration gradient where the polymer concentration increases from one surface of the electrode substrate contacting the catalyst layer to the other surface of the electrode substrate.

The electrode substrate may include a patterned hydrophobic polymer layer on its surface. The hydrophobic polymer layer may be present on only one side or each side of the electrode substrate.

The electrode substrate may include hydrophilic channels for releasing water, and the hydrophobic polymer may be present except on the regions of the hydrophilic channels.

The hydrophobic polymer may include fluoro-based polymers such as poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, and so on, polyolefin-based polymers such as poly(ethylene), poly(propylene), poly(isoprene), ethylene propylene monomer, poly(butadiene), and benzene-containing polymers such as polystyrene, polyalphamethylstyrene, and so on.

The electrode substrate may include a through-hole with hygroscopic porous material filled therein.

The hygroscopic porous material may include a polymer fiber, a polymer foam, inorganic oxide, and so on.

The polymer fiber may include cellulose, rayon, cotton, polyester, polyamide, polyvinyl alcohol, polyethylene oxide, polyhydroxyethylmethylacrylate, or copolymers thereof.

The polymer foam may include polyurethane foam, polycarbonate foam, and so on.

The inorganic oxide may include silica, titania, alumina, zeolite, and so on.

According to a second embodiment of the present invention, a method of preparing an electrode for a fuel cell is provided which includes forming a patterned hydrophobic polymer layer on one surface of an electrode substrate and coating a hydrophobic polymer liquid thereon, and forming a catalyst layer on the other surface of the electrode substrate to which the patterned hydrophobic polymer layer is formed.

The hydrophobic polymer may be coated by mounting a mask on the electrode substrate. The patterned hydrophobic polymer layer may be manufactured by the following process: coating non-polar materials on the electrode substrate after mounting a mask having a shape corresponding to the channels on the electrode substrate; performing water-repellent coating with a hydrophobic polymer after removing the mask; and removing the non-polar materials by dissolving the non-polar materials with a non-polar solvent.

According to a third embodiment of the present invention, a membrane-electrode assembly for a fuel cell is provided, which includes an anode, a cathode, and a polymer electrolyte membrane interposed therebetween. The anode or cathode includes a catalyst layer and an electrode substrate supporting the catalyst layer. The electrode substrate includes a hydrophilic region and a hydrophobic region separated from each other.

The electrode substrate may include a hydrophobic polymer which is present at a concentration gradient.

The hydrophobic polymer has a concentration gradient where the polymer concentration increases from one surface of the electrode substrate contacting the catalyst layer to the other surface of the electrode substrate.

The electrode substrate may include a patterned hydrophobic polymer layer on its surface. The hydrophobic polymer layer may be present on only one side or each side of the electrode substrate.

The electrode substrate may include hydrophilic channels for releasing water, and the hydrophobic polymer is present except on the regions of the hydrophilic channels.

The hydrophobic polymer may include fluoro-based polymers such as poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, and so on, polyolefin-based polymers such as poly(ethylene), poly(propylene), poly(isoprene), ethylene propylene monomer, poly(butadiene), and benzene-containing polymers such as polystyrene, polyalphamethylstyrene, and so on.

The electrode substrate may include a through-hole with hygroscopic porous materials filled therein.

The hygroscopic porous material may include a polymer fiber, a polymer foam, inorganic oxide, and so on.

The polymer fiber may include cellulose, rayon, cotton, polyester, polyamide, polyvinyl alcohol, polyethyleneoxide, polyhydroxyethylmethylacrylate, copolymers thereof, or a mixture thereof.

The polymer foam may include polyurethane foam, polycarbonate foam, and so on.

The inorganic oxide may include silica, titania, alumina, zeolite, and so on.

According to a fourth embodiment of the present invention, a membrane-electrode assembly is provided which includes a polymer electrolyte membrane, catalyst layers positioned at each side of the polymer electrolyte membrane, and electrode substrates positioned on the surfaces of the catalyst layers which do not contact the polymer electrolyte membrane. On the electrode substrate, a hydrophobic polymer layer is formed and the hydrophobic polymer is present in the electrode substrate with a predetermined concentration gradient.

The hydrophobic polymer has a concentration gradient where the polymer concentration increases from the one surface of the electrode substrate contacting the catalyst layer to the other surface of the electrode substrate.

The electrode substrate may include a patterned hydrophobic polymer layer on its surface.

According to a fifth embodiment of the present invention, a fuel cell system includes: an electricity generating element including a membrane-electrode assembly and separators positioned at each side of the membrane-electrode assembly; a fuel supplier; and an oxidant supplier. The membrane-electrode assembly has a structure according to the third or fourth embodiment.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF INVENTION

Figure 1:
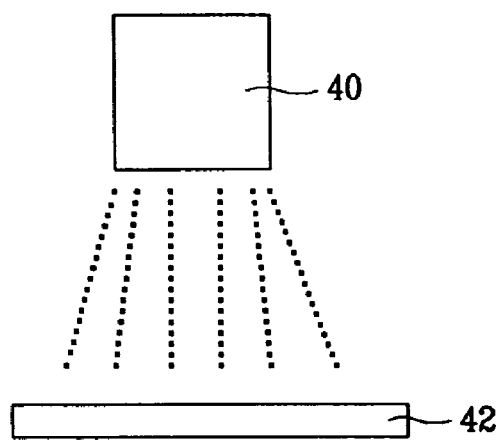
FIG. 1 shows a process of manufacturing the electrode substrate according to one embodiment of the present invention.

An electrode for a fuel cell is generally composed of a catalyst layer performing an electrochemical reaction and an electrode substrate supporting the catalyst layer. The electrode substrate is referred to as a gas diffusion layer (GDL) because it contacts a separator, and performs functions of uniformly transporting and diffusing reactants, such as fuel or air, to catalysts in the catalyst layer.

The electrode substrate also performs functions of rapidly releasing water produced at the catalyst layer to a gas flow of the separator and of conducting electrons required for a reaction or produced during a reaction. For performing the functions, a porous conductive substrate is generally used for the electrode substrate. The electrode substrate can include carbon paper, carbon cloth, carbon felt, and so on, but is not limited thereto.

Water produced at the catalyst layer may be agglomerated in pores of an electrode substrate, which may preclude gas diffusion passage and prevent fuel transport of a fuel to a catalyst layer. In the prior art, in order to prevent such water flooding phenomenon where water is agglomerated in the pores, an electrode substrate is treated with a water repellent polymer such as polytetrafluoroethylene. The electrode substrate is dipped in a solution including the water repellent polymer, a solvent is volatilized, and then it is heat-treated at high temperature to fire the water repellent polymer. Such a method is complicated because the three steps of dipping in a solution, drying, and sintering have to be preformed.

In the present invention, an electrode for a fuel cell is capable of maintaining moisture hygroscopicity of a polymer electrolyte membrane at a predetermined level, releasing water produced at the cathode thereby preventing clogging of pores of the membrane by the water, and improving a current density at high rate. The electrode substrate includes a hydrophilic region and a hydrophobic region separated from each other. The hydrophilic region and the hydrophobic region are separated from each other with a fine interval.

The electrode substrate may include a hydrophobic polymer which is present at a concentration gradient. The hydrophobic polymer has a concentration gradient where the polymer concentration increases from the one surface of the electrode substrate contacting the catalyst layer to the other surface of the electrode substrate.

When the hydrophobic polymer is present with a concentration gradient, the one surface of the electrode substrate contacting the catalyst layer has low hydrophobicity, and thus water produced at the catalyst layer can be transported to the electrode substrate and released outside. On the contrary, when the electrode substrate is hydrophobic-treated by dipping, a hydrophobic polymer is present over the entire area of the electrode substrate in the same amount. In this case, the one surface of the electrode substrate contacting the catalyst layer has a relatively large hydrophobicity, and water generated at the catalyst layer may be prevented from being transported to an electrode substrate and released outside.

The electrode substrate may include a patterned hydrophobic polymer layer on its surface. The pattern may be of various types, and therefore, it is not necessary to limit it to any special type.

The hydrophobic polymer layer may be positioned on only one surface or both surfaces of the electrode substrate, although it is preferable that the hydrophobic polymer layer is positioned on only one surface.

The hydrophobic polymer layer may be formed by coating a hydrophobic polymer on an electrode substrate. The coating method may include a dry or wet coating method. The wet coating method may include screen printing, spray coating, or coating using a doctor blade. The dry coating method may include sputtering, vacuum heat deposition, chemical vapor deposition, physical vapor deposition, plasma enhanced chemical vapor deposition, pulsed laser deposition, laser ablation technique, hot wire chemical vapor deposition, radiation etching, and so on.

During the deposition process, high power is applied to a target hydrophobic polymer material to be deposited on the electrode substrate and a temperature is increased to evaporate the polymer material to deposit it on the electrode substrate. In this connection, the temperature may range from 300 to 1200° C. (Celsius), and preferably from 500 to 1000° C. The deposition may be performed by generating plasma under vacuum atmosphere or Ar atmosphere, and the plasma collides with the hydrophobic polymer target to evaporate the hydrophobic polymer.

As shown in FIG. 1, a polymer 40 is gasified by heating or plasma-treating to form a layer on an electrode substrate 42 and a portion of the polymer 40 is invaded into the inside of the electrode substrate 42 to be present at a concentration gradient. The deposition process may be performed on only one side or both sides of the electrode substrate. Particularly, as described above, water releasing efficiency may be improved by not forming a hydrophobic polymer layer on the one surface of the electrode substrate contacting the catalyst layer, and making the hydrophobic polymer exist therein. However, in the dipping process of the prior art, it is difficult to coat only one side of an electrode substrate.

After the hydrophobic polymer is coated on the electrode substrate, a membrane-electrode assembly is fabricated using the electrode substrate. Alternatively, catalyst layers are formed on each side of the polymer electrolyte membrane and then it is assembled with electrode substrates which are not treated with a hydrophobic polymer to fabricate a membrane-electrode assembly. The electrode substrate of the membrane-electrode assembly can be treated with a hydrophobic polymer. In the latter method, a membrane-electrode assembly can be made by performing an additional hydrophobic polymer coating process without modifying the conventional manufacturing system of the membrane-electrode assembly.

Figure 2:
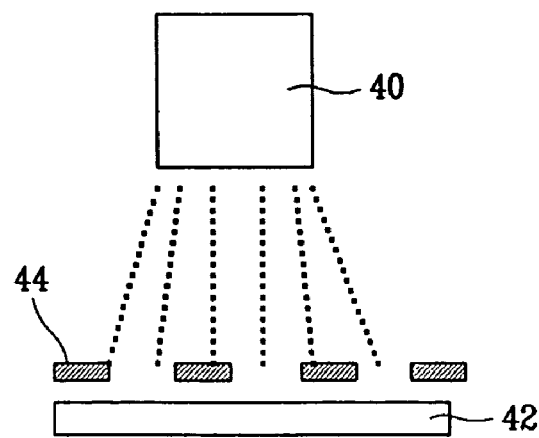
FIG. 2 shows a process of manufacturing the electrode substrate according to another embodiment of the present invention.

The coating process can be performed by coating an optional hydrophobic treatment using a mask 44 as shown in FIG. 2. Portions untreated with a hydrophobic polymer function as passages for releasing water and maximize water releasing efficiency.

Non-limiting examples of the hydrophobic polymer include fluoro-based polymers such as poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, and so on, polyolefin-based polymers such as poly(ethylene), poly(propylene), poly(isoprene), ethylene propylene monomer, poly(butadiene), and benzene-containing polymers such as polystyrene, polyalphamethylstyrene, and so on.

Figure 3:
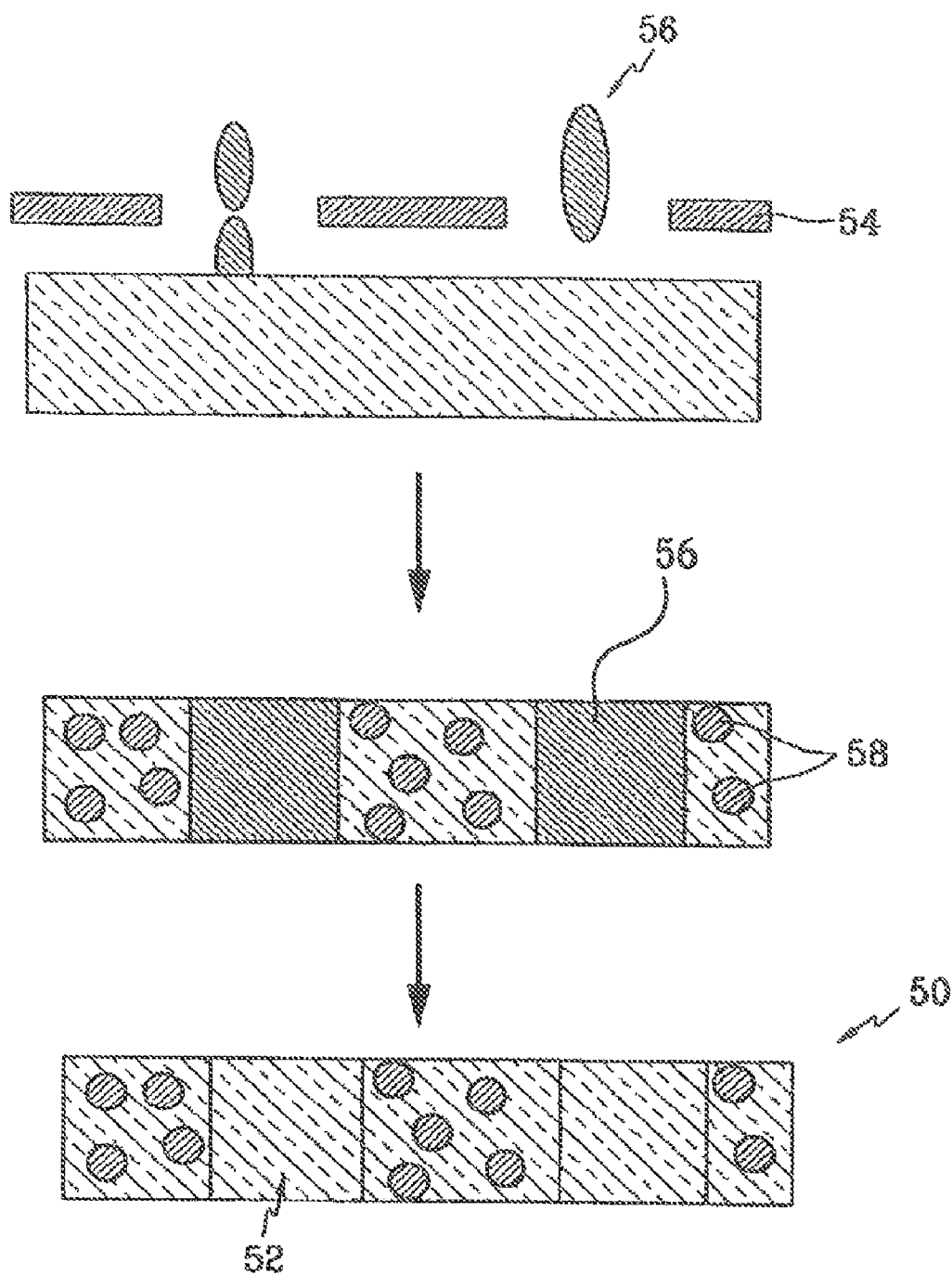
FIG. 3 shows a process of manufacturing the electrode substrate according to another embodiment of the present invention.

FIG. 3 shows a process of manufacturing the electrode substrate according to another embodiment of the present invention. Referring to FIG. 3, the electrode substrate 50 includes hydrophilic channels 52. The regions except for the hydrophilic channels are coated with a water-repellent polymer and function as gas transmission regions.

The channels 52 have a size ranging from 10 to 1000 micrometers, and preferably 50 to 500 micrometers. When the size of the channel is less than 10 micrometers, water generated at a cathode is difficult to be released outside. When it is more than 1000 micrometers, gas is not transferred to the catalyst layer which is positioned in the channel resulting in reduction of a cell power output.

The channel may have a circular shape, but it is not limited thereto and can be made into various shapes.

In the electrode substrate 50, the total area of the channel areas ranges from 5 to 50%, and preferably 10% to 40%, of the entire area of the electrode substrate 50. When the total channel area is less than 5%, it has a problem of releasing water. When it is more than 50%, mechanical strength of the electrode substrate 50 may be reduced.

After mounting a mask 54 having a shape corresponding to the channels 52 on the electrode substrate 50, non-polar materials 56 are coated on the electrode substrate 50. Since the mask 54 has a shape corresponding to the channels 52, the mask has an opening ratio of 5 to 50%, and preferably an opening ratio of 10% to 40%.

Subsequently, the mask 54 is removed and water-repellent coating with a hydrophobic polymer 58 is performed. The remaining regions except for the regions where non-polar materials are coated are water-repellent treated. The non-polar materials 56 are removed by dissolving them with a non-polar solvent to fabricate an electrode substrate 50 in which hydrophilic channels 52 are formed to release water. After or before the non-polar material is removed, heat treatment may be performed. That is to say, after the non-polar material is dissolved with a solvent, heat-treatment may be performed. Alternatively, after an electrode substrate is heat-treated, the non-polar material can be removed by dissolving it with a solvent.

The non-polar material coating and water-repellent coating processes may be performed using screen printing, spray coating, or a coating using a doctor blade, gravure coating, dip coating, silk screening, painting, a method using a slot die, tape coating, and so on, depending on the viscosity of the composition, but are not limited thereto.

The non-polar material is a capping material for preventing water-repellent coating of the hydrophilic channels to allow release of water outside. Non-limiting examples of the non-polar material include polystyrene, polysiloxane, polyvinylchloride, polyvinylfluoride, polyvinylidenedifluoride, a polyvinylidenedifluoride-hexafluoropropane copolymer, or a mixture thereof, but is not limited thereto.

The solvent to dissolve the non-polar material includes a non-polar solvent such as benzene, acetone N-methylpyrrolidone, tetrahydrofuran, chloroform, and so on.

The heat treatment may be performed at a temperature of from 300 to 450° C. (Celsius) and may range from 1 to 10 hours. When the heat treatment temperature is more than 450° C. and the heat treatment time is more than 10 hours, functions of a water-repellent polymer may be deteriorated. When the heat treatment temperature is less than 300° C. and the heat treatment time is less than 1 hour, water-repellent efficiency may be reduced.

Non-limiting examples of the hydrophobic polymer may include fluoro-based polymers such as poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, and so on, and polyolefin-based polymers such as poly(ethylene), poly(propylene), poly(isoprene), ethylene propylene monomer, poly(butadiene), and benzene-containing polymers such as polystyrene, polyalphamethylstyrene, and so on.

Figure 4A:
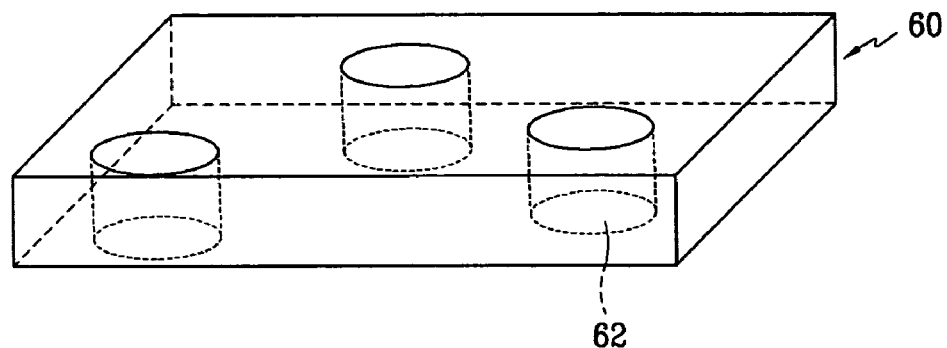
FIGS. 4A to 4C show a process of manufacturing the electrode substrate according to another embodiment of the present invention.
Figure 4B:
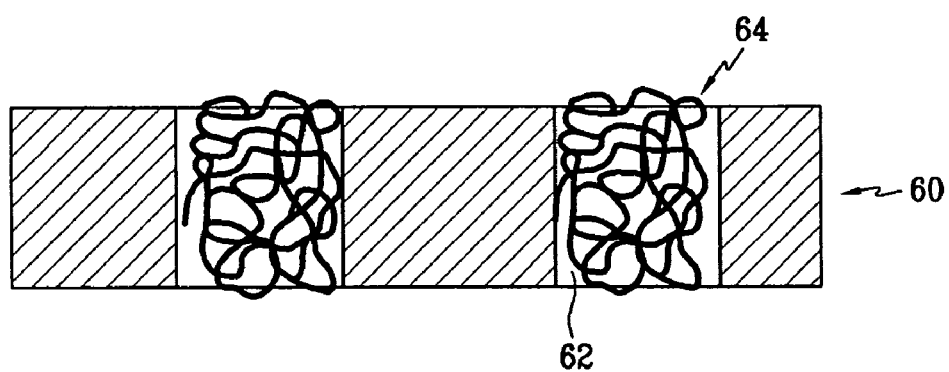
Figure 4C:
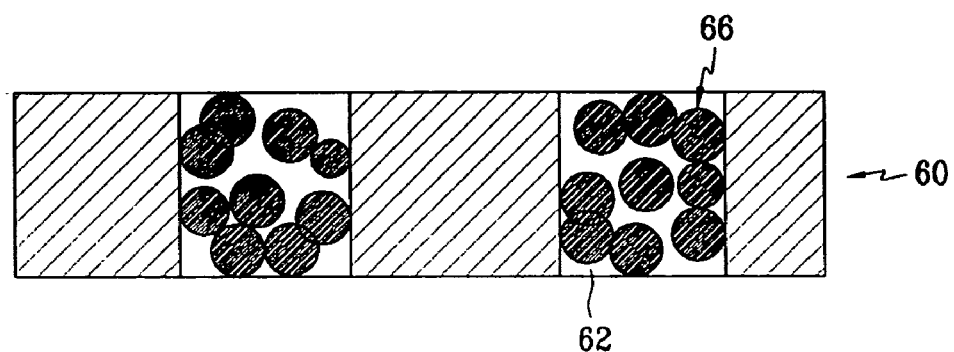

FIGS. 4A to 4C show a process of manufacturing the electrode substrate according to another embodiment of the present invention. Referring to the drawings, the electrode substrate 60 includes through-holes 62 which pass through the electrode substrate 60. In the through-holes 62, hygroscopic porous materials 64 and 66 are present.

The through-holes 62 have a size ranging from 10 to 1000 micrometers, and preferably from 50 to 500 micrometers ($\mu$m). When the size of the through-holes 62 is less than 10 micrometers, water generated at the cathode is difficult to be released outside and when it is more than 1000 micrometers, gas is not transferred to the catalyst layer which is positioned in the channels resulting in reduction of a cell power output. The through-holes 62 may have a circular shape, but are not limited thereto and can be made into various shapes.

In the electrode substrate, the total area of the through-holes ranges from 5 to 50%, and preferably from 10 to 40% of the entire area of the electrode substrate 60. When the total through-hole area is less than 5%, it has a problem of releasing water, and when it is more than 50%, mechanical strength of the electrode substrate 60 may be reduced.

The hygroscopic porous materials 64 and 66 may include a polymer fiber, a polymer foam, inorganic oxide, and so on. The polymer fiber may include cellulose, rayon, cotton, polyester, polyamide, polyvinyl alcohol, polyethylene oxide, polyhydroxyethyl methylacrylate, or copolymers thereof. The polymer foam may include polyurethane foam, polycarbonate foam, and so on. The inorganic oxide may include silica, titania, alumina, zeolite, and so on.

In the electrode substrate 60 according to the present embodiment, through-holes 62 are formed in the electrode substrate 60 and porous hygroscopic materials 64 and 66 are filled into the through-holes 62. Before or after forming the through-holes 62, water-repellent coating may be performed. The through-holes 62 may be formed using mechanical punching, laser cutting, etc.

The porous hygroscopic materials 64 and 66 may be filled using a suitable method depending on a kind of the porous hygroscopic materials 64 and 66. For example, when a polymer fiber is used, slurry, including the polymer fiber, a binder, and a solvent, is injected into the through-hole 62 and then the solvent is removed by evaporation. Alternatively, the polymer fiber may be filled as follows: after a polymer solution in which a polymer is uniformly dissolved in a solvent is coated into the through-holes 62 of the electrode substrate 60, the solvent is volatilized rapidly to form pores. In the present invention, the solution may be a clear solution or an opaque emulsion. Alternatively, the polymer fiber may be filled as follows: after a polymer solution in which a polymer is uniformly dissolved in a solvent is coated into the through-holes 62 of the electrode substrate 60, it is dipped in another solvent which has a low affinity for the polymer, thereby inducing a phase separation and filling the polymer. Alternatively, porous polymer fiber may be filled as follows: a mixture of a polymer and a solvent having low volatility, or organic or inorganic material having a weight average molecular weight of less than or equal to 10,000, is filled into a through-hole 62, and then it is dipped in a solvent which can preferentially dissolve the low volatile solvent, or organic or inorganic material having a weight average molecular weight of less than or equal to 10,000, to extract it. When a polymer foam is filled, a mixture of a forming agent and a polymer is put into the through-hole 62 and then heating or photo-radiation is performed to induce foaming. When an inorganic oxide is filled, a slurry mixture of an inorganic oxide, a binder, and a solvent is put into the through-hole 62, and then the solvent is evaporated.

The electrode of the present invention includes a catalyst layer formed on the electrode substrate. The catalyst layer includes a metal catalyst to help the related reaction (oxidation of a fuel and reduction of oxygen). Suitable catalysts include platinum (Pt), ruthenium (Ru), osmium (Os), platinum-ruthenium alloys, platinum-osmium alloys, platinum-palladium alloys, or platinum-M alloys, where M is at least one transition metal selected from the group consisting of Ga, Ti, V, Cr, Mn, Fe, Co, Ni, Cu, and Zn. The metal catalyst may be supported on a carrier. Suitable carriers include carbon, such as acetylene black and graphite, and inorganic particulates, such as alumina, silica, zirconia, and titania.

The catalyst layer may be formed on the electrode substrate using a slurry coating or depositing the catalyst.

A micro-porous layer (MPL) can be added between the aforementioned electrode substrate and catalyst layer to increase gas diffusion effects. It uniformly supplies gas into the catalyst layer and transmits electrons thereon into a porous polymer layer.

It is formed by coating a composition including conductive powder, binder resin, and solvent onto the conductive electrode substrate.

In general, the conductive powder may include, but is not limited to, carbon powder, carbon black, acetylene black, activated carbon, fullerene, carbon fiber, and nano carbon such as carbon nanohorns, carbon nanorings, carbon nanotubes, carbon nanofiber, and carbon nano wire.

The binder resin may include, but is not limited to, polytetrafluoro ethylene (PTFE), polyvinylidene fluoride, polyhexafluoro propylene, polyperfluoroalkylvinyl ether, polyperfluoro sulfonylfluoride alkoxy vinyl ether, and copolymers thereof.

The solvent may include, but is not limited to: an alcohol such as ethanol, isopropyl alcohol, ethyl alcohol, n-propyl alcohol, or butyl alcohol; water; dimethylacetamide (DMAc); dimethyl formamide; dimethyl sulfoxide (DMSO); N-methylpyrrolidone; or tetrahydrofuran.

The coating method may include, but is not limited to, screen printing, spray coating, doctor blade methods, gravure coating, dip coating, silk screening, painting, and so on, depending on the viscosity of the composition.

In a fuel cell, a cathode and an anode may be differentiated from each other by their functions. The electrode of the present invention may be used as an anode for oxidizing hydrogen or fuel and as a cathode for reducing an oxidant. Preferably, the electrode of the present invention is used for a cathode where water is produced.

Figure 5:
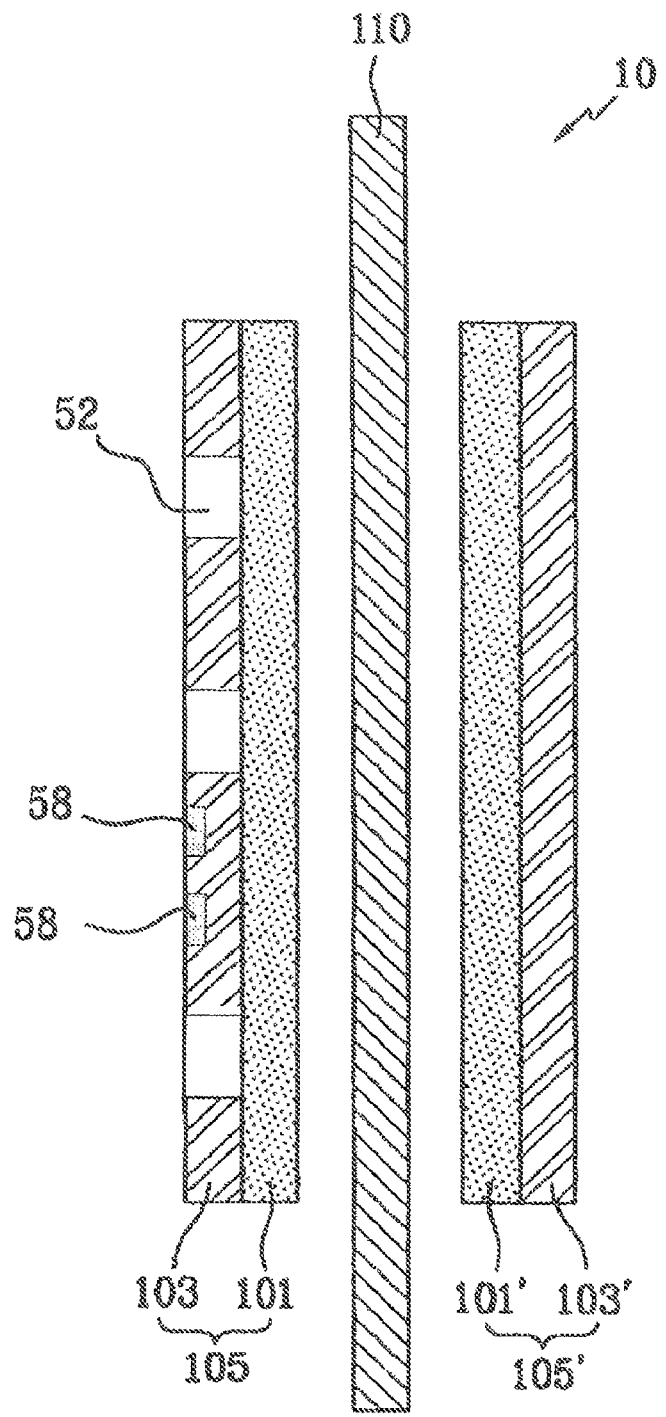
FIG. 5 is a schematic cross-sectional view showing a membrane-electrode assembly according to another embodiment of the present invention.

A membrane-electrode assembly is fabricated by positioning a proton conductive polymer membrane between the anode and the cathode. FIG. 5 shows a schematic structure of a membrane-electrode assembly according to another embodiment of the present invention. As shown in FIG. 5, a membrane-electrode assembly 10 includes catalyst layers 101 and 101' and electrode substrates 103 and 103' which are separated by a polymer electrolyte membrane 110. The electrode substrates 103 and 103' include a hydrophilic region and a hydrophobic region separated from each other. For example, electrode substrate 103 shows hydrophilic regions 52, and hydrophobic polymer 58.

The proton conductive polymer for the electrolyte membrane of the present invention may be any polymer resin having a cation exchange group selected from the group including a sulfonic acid group, a carboxylic acid group, a phosphoric acid group, a phosphonic acid group, and derivatives thereof, at its side chain.

Non-limiting examples of the polymer include at least one proton conductive polymer selected from the group including perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers and polyphenylquinoxaline-based polymers. In a preferred embodiment, the proton conductive polymer is at least one selected from the group including poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly (2,2'-(m-phenylene)-5,5'-bibenzimidazole) or poly (2,5-benzimidazole). However, the proton conductive polymer is not limited thereto. The polymer electrolyte membrane generally has a thickness ranging from 10 to 200 μm (microns).

The fuel cell system may be fabricated as follows: the membrane-electrode assembly is interposed between separators including gas flow channels and cooling channels to fabricate an electricity generating element and a plurality of such electricity generating elements are stacked to fabricate a stack. The fuel cell system can be fabricated by an ordinary technique.

In the present invention, an electrode substrate having moisture hygroscopicity maintains water produced at a cathode in a predetermined amount between the polymer electrolyte membrane and the cathode. Generally, in a fuel cell, a predetermined level of moisture should be maintained since it can be operated under a humidified condition. In the present invention, the electrode substrate adsorbs water produced at a cathode to maintain moisture in a polymer electrolyte membrane at a predetermined level. The electrode substrate adsorbing water produced at a cathode to maintain moisture in a polymer electrolyte membrane at a predetermined level makes a fuel cell operate under non-humidified condition at a low temperature.

Excessive water is released through the hydrophilic region of the electrode substrate and therefore pores of the polymer electrolyte membrane are not precluded by water.

The electrode of the present invention may be applied to all types of fuel cell systems, particularly to a polymer electrolyte fuel cell (PEMFC) and a direct oxidation fuel cell (DOFC) such as a direct methanol fuel cell (DMFC).

Figure 6:
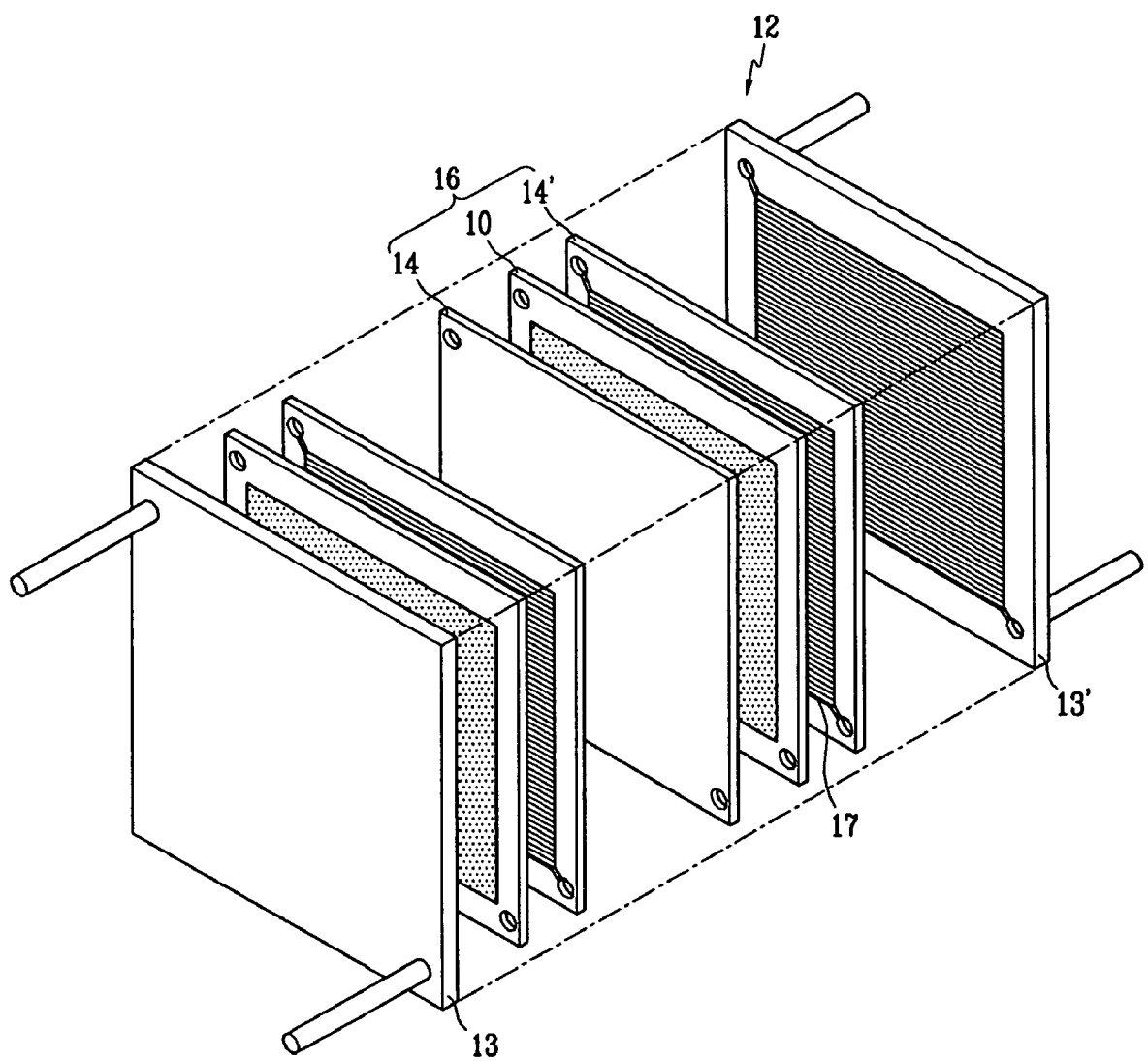
FIG. 6 is an exploded perspective view showing a structure of a fuel cell stack.

FIG. 6 is an exploded perspective view of a fuel cell stack. Referring to FIG. 6, a fuel cell stack 12 has a structure in which several unit cells 16, each having a membrane-electrode assembly (MEA) 10 and separators 14 and 14' closely adjacent to each side of the MEA 10, are stacked adjacent to one another in series.

The membrane-electrode assembly 10 is composed of an anode (referred to also as "fuel electrode" or "oxidation electrode") and a cathode (referred to also as "air electrode" or "reduction electrode") that are separated by a polymer electrolyte membrane. The anode and the cathode are composed of a catalyst layer contacting a polymer electrolyte membrane and a gas diffusion layer (GDL) contacting the catalyst layer.

The separators 14 and 14' include gas flow paths 17 for supplying a fuel to the anode and an oxidant to the cathode. The separators positioned at the outermost ends of the stack 12 are defined as end plates 13 and 13'.

Figure 7:
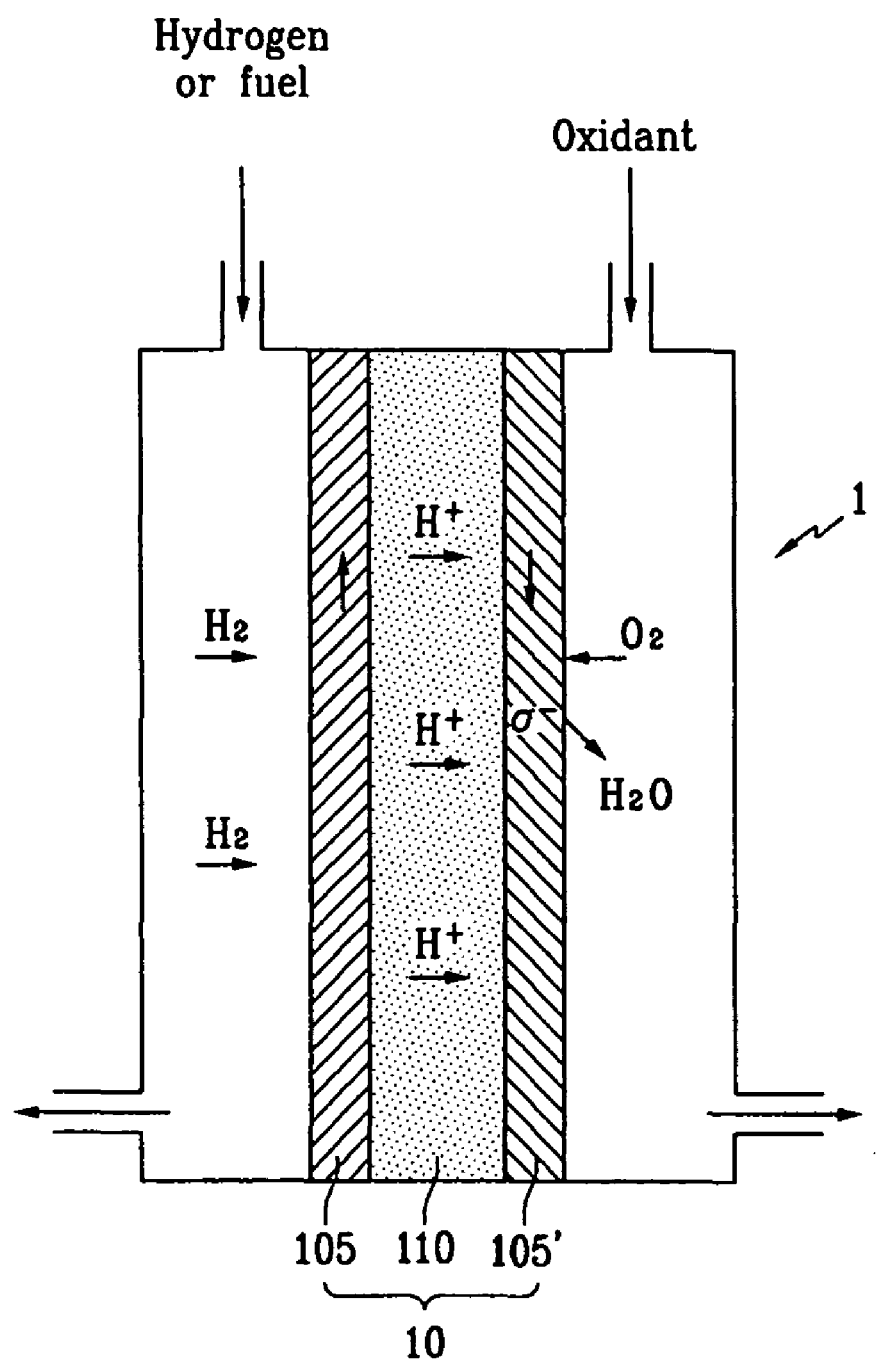
FIG. 7 is a schematic view showing an operating principle of a fuel cell.

FIG. 7 is a schematic view showing an operating principle of a fuel cell 1 including an anode 105, a cathode 105', and a polymer electrolyte membrane 110. For the anode 105 and the cathode 105', the electrode of the present invention may be used. Referring to FIG. 7, hydrogen or a fuel is supplied to the anode 105 and an oxidant is supplied to the cathode 105' through separators. The oxidant may include air or oxygen. At the anode 105, the hydrogen or fuel is oxidized and at the cathode 105', the oxidant is reduced. As a result of the transfer of the electrons generated by the oxidation/reduction reactions, electrical energy, heat, and moisture are produced.

Figure 8:
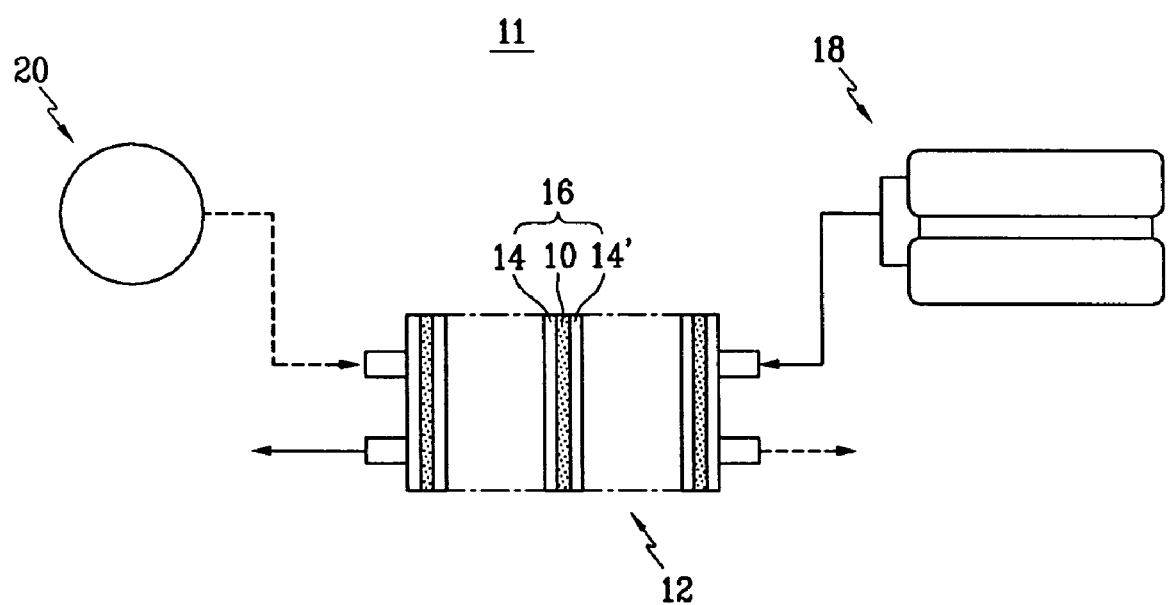
FIG. 8 is a schematic view showing a fuel cell system which includes the electrode of the present invention.

FIG. 8 shows a schematic structure of a fuel cell system which includes an electrode according to the present invention. It will be described in detail with reference to this accompanying drawing as follows. Referring to FIG. 8, a fuel cell system 11 includes: a) an electricity generating element 16 which includes i) a membrane-electrode assembly 10 which includes a pair of electrodes including the above electrode substrate and a catalyst layer, and a polymer electrolyte membrane between the electrodes, and ii) separators 14 and 14' positioned at each side of the membrane-electrode assembly 10; b) a fuel supplier 18; and an oxidant supplier 20.

More particularly, the fuel cell system 11 includes: a stack 12 which includes at least one electricity generating element 16 to generate electrical energy through oxidation of a fuel and reduction of an oxidant; a fuel supplier 18; and an oxidant supplier 20. The electricity generating element 16 includes a membrane-electrode assembly 10 which performs oxidation of a fuel and reduction of an oxidant, and separators (bipolar plates) 14 and 14' which are positioned on each side of the membrane-electrode assembly 10 and provide the fuel and oxidant.

The fuel supplier 18 may be equipped with a fuel storage tank, and a fuel pump connected to the fuel tank.

The fuel pump discharges a fuel stored in the fuel tank with a predetermined pumping force. Alternatively, the fuel may be provided to the electricity generating element 16 by diffusion instead of by the pump.

The oxidant supplier 20 which supplies oxidant to the electricity generating element 16 of the stack 12 is equipped with at least one pump to draw an oxidant with a predetermined pumping force. Alternatively, the oxidant may be provided to the electricity generating element 16 by diffusion instead of by the pump.

The following examples illustrate the present invention in more detail. However, it should be understood that the present invention is not limited by these examples.

COMPARATIVE EXAMPLE 1

Carbon paper (TORAY Company) was dipped in a 20 wt % concentration of polytetrafluoroethylene emulsion. The carbon paper dipped in the polytetrafluoroethylene emulsion was dried at room temperature, and heat-treated at 350° C. to prepare a water-repellent-treated electrode substrate. A catalyst layer was formed on the water-repellent-treated carbon paper in a loading amount of 0.4 mg/cm$^2$ (milligrams per square centimeters). The resulting electrode substrates were positioned at each side of a NAFION-112 membrane and hot-pressed to fabricate a membrane-electrode assembly.

EXAMPLE 1

Polytetrafluoroethylene was heated at 600° C. to gasify the polytetrafluoroethylene, and then the gasified polytetrafluoroethylene was deposited on non-water-repellent-treated carbon paper (TORAY Company). During the deposition, a mask with circular holes having a diameter of 3 mm (millimeters) was positioned on the carbon paper and the polytetrafluoroethylene was partially deposited through the holes. The total area of the holes covered up to 80% of the area of the carbon paper.

Resultantly, polytetrafluoroethylene was deposited on 80% of the carbon paper with circular shapes having a diameter of 3 mm to prepare an electrode substrate. Using the electrode substrate, a membrane-electrode assembly was fabricated according to the same method as in Comparative Example 1.

Figure 9:
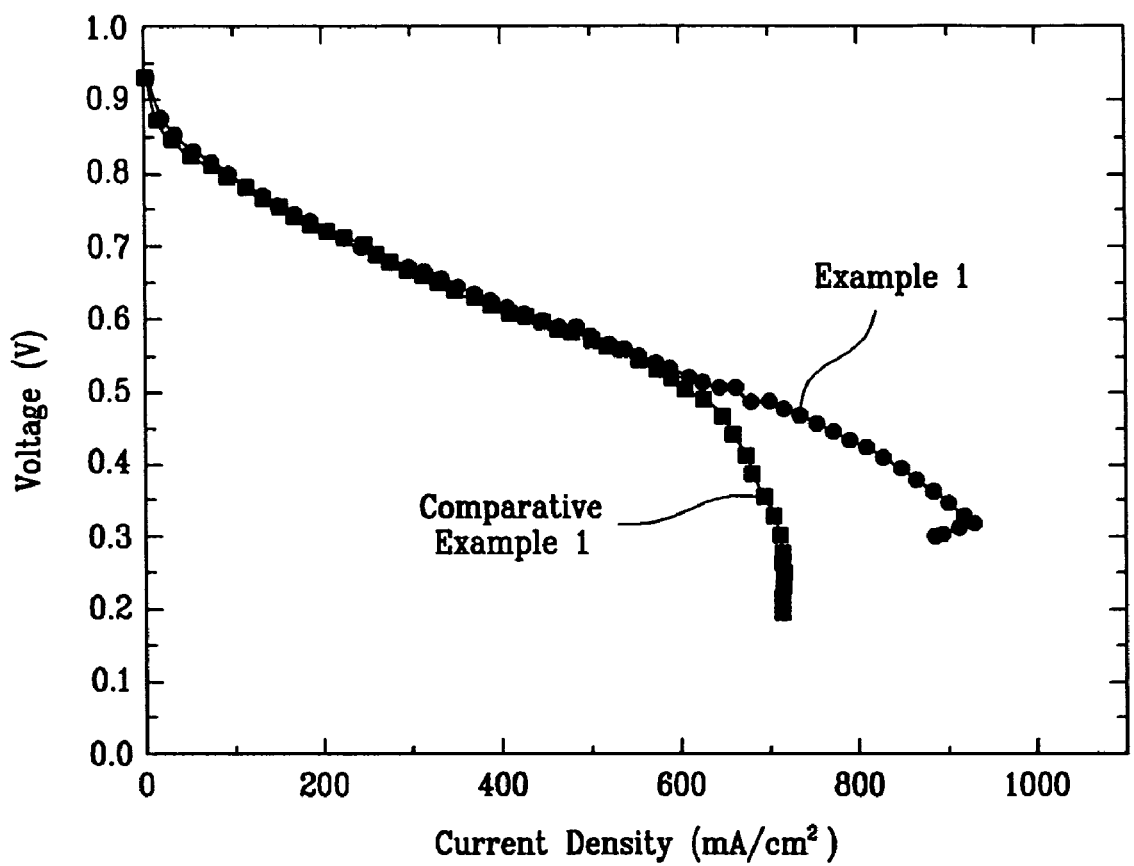
FIG. 9 is a graph showing cell performances of the fuel cells including the membrane-electrode assemblies according to Example 1 of the present invention and Comparative Example 1.

Using the membrane-electrode assemblies fabricated according to Example 1 and Comparative Example 1, single cells was fabricated in accordance with a conventional method. 80% humidified air/H$_2$ was supplied to the cells at normal pressure to measure performance of the fuel cells. The measurement results are shown in FIG. 9. As shown in FIG. 9, current density of Comparative Example 1 was remarkably reduced at a voltage of less than 0.4V (volts). This result is induced from the fact that water generated at the cathode flooded the cathode to approach a mass transfer limit.

On the contrary, water generated at the cathode of the fuel cell according to Example 1 was released outside through the non-water-repellent treated regions. Thereby, decrease of current density by water flooding was reduced compared to Comparative Example 1.

EXAMPLE 2

60 wt % of polytetrafluoroethylene was dispersed in water to prepare an emulsion. The emulsion was sprayed with a speed of 20 ml/min on a carbon paper (31AA, SGL Company) heated at 60° C. The sprayed amount of the polytetrafluoroethylene emulsion was 3 mg/cm$^2$. The sprayed regions had hydrophobicity and the remaining regions had relative hydrophilicity. Then, the carbon paper was heated at 350° C. for two hours to prepare an electrode substrate.

A coating composition for forming a catalyst layer was prepared by mixing 20 parts by weight of platinum supported on carbon powder (Pt/C, platinum supporting amount: 20 wt %), 10 parts by weight of NAFION® (DUPONT Company), and 70 parts by weight of water and then was coated on the electrode substrate to fabricate a cathode. The coating composition was coated on a carbon paper (31BC, SGL Company) for an electrode substrate to fabricate an anode. A NAFION® (DUPONT Company) polymer membrane was interposed between the resultant cathode and anode, and hot-pressed at 120° C. for 1 minute to fabricate a membrane-electrode assembly (MEA). The fabricated membrane-electrode assembly was positioned between two sheets of gaskets and then interposed between two separators where gas flow channels and cooling channels having predetermined shapes are formed. The resultant assembly was pressed between copper end plates to fabricate a single cell.

EXAMPLE 3

A single cell was fabricated according to the same method as in Example 2 except that a sprayed amount of the polytetrafluoroethylene emulsion was 6 mg/cm$^2$.

COMPARATIVE EXAMPLE 2

A single cell was fabricated according to the same method as in Example 2 except that a water-repellent treated carbon paper (31BA, SGL Company) was used as the electrode substrate of the cathode.

3M methanol was supplied to the anodes of the cells according to Examples 2 and 3, and Comparative Example 2 using a pump and air was breathed to the cathodes of the cells according to Examples 2 and 3, and Comparative Example 2 to measure current density and voltage performance of the fuel cells. The measurement results are shown in FIG. 10.

Figure 10:
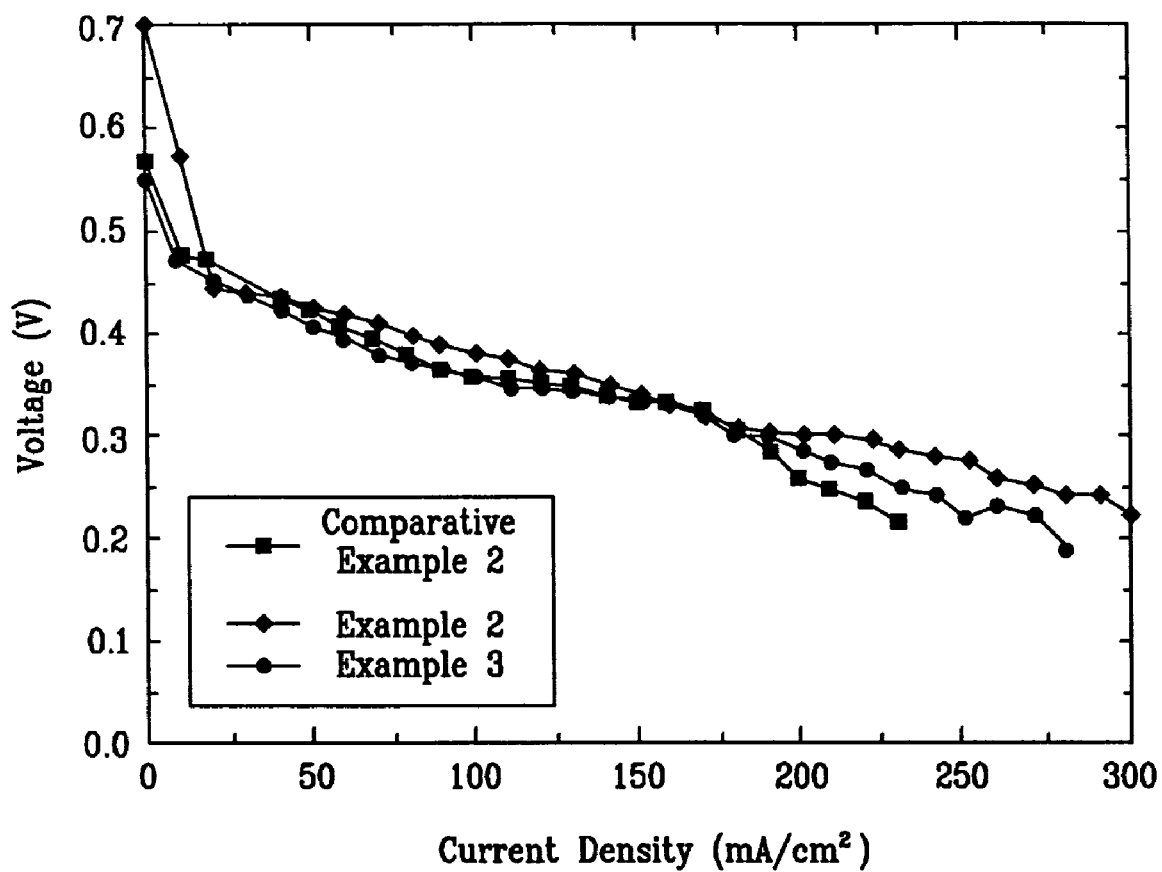
FIG. 10 is a graph showing cell performances of the fuel cells according to Examples 2 and 3 of the present invention and Comparative Example 2.

As shown in FIG. 10, Examples 2 and 3, including the electrode substrate having hydrophilic and hydrophobic regions, showed higher current density compared to Comparative Example 2 at the same voltage, resulting in high power density. These results are induced from the fact that water generated at the cathode was easily released outside through the hydrophilic regions and thereby water clogging did not occur. In particular, Example 3 showed high voltages at high current density as well as at low current density. This result is induced from the fact that the hydrophobic regions of the cathode promoted water release and also played a role of diffusing air.

EXAMPLE 4

A mask having a diameter of 500 micrometers and 30% opening ratio was positioned on a carbon paper (BA30, SGL Company) and an acetone solution including 5 wt % polystyrene for a non-polar material was screen-printed. After removing the mask, the carbon paper was dipped in a polytetrafluoroethylene emulsion to water-repellent coat the regions except for the regions coated with the polystyrene. The polystyrene was dissolved with acetone and then the carbon paper was heat-treated at 350° C. for 5 hours to fabricate an electrode substrate including hydrophilic channels for releasing water.

A coating composition for forming a catalyst layer was prepared by mixing 20 parts by weight of platinum supported on a carbon powder (Pt/C, platinum supporting amount: 20 wt %), 10 parts by weight of NAFION® (DUPONT Company), and 70 parts by weight of water and then was coated on the electrode substrate to fabricate an electrode.

A NAFION® (DUPONT Company) polymer membrane was interposed between the resultant electrodes as an anode and a cathode, and hot-pressed at 120° C. for 1 minute to fabricate a membrane-electrode assembly (MEA). The fabricated membrane-electrode assembly was positioned between two sheets of gaskets and then interposed between two separators where gas flow channels and cooling channels having predetermined shapes are formed. The resultant assembly was pressed between copper end plates to fabricate a single cell.

EXAMPLE 5

A single cell was fabricated according to the same method as in Example 4 except that a mask having a diameter of 250 micrometers and 30% opening ratio was used.

EXAMPLE 6

A single cell was fabricated according to the same method as in Example 4 except that a mask having a diameter of 500 micrometers and 50% opening ratio was used.

EXAMPLE 7

A single cell was fabricated according to the same method as in Example 4 except that polyvinylchloride was used as the non-polar material instead of polystyrene.

COMPARATIVE EXAMPLE 3

A carbon paper (BA30, SGL Company) was dipped into a polytetrafluoroethylene emulsion to perform water-repellent coating. Then, the carbon paper was heat-treated at 350° C. for 5 hours to fabricate an electrode substrate.

A coating composition for forming a catalyst layer was prepared by mixing 20 parts by weight of platinum (Pt) supported on a carbon powder (Pt/C, platinum supporting amount: 20 wt %), 10 parts by weight of NAFION® (DUPONT Company), and 70 parts by weight of water and then was coated on the electrode substrate to fabricate an electrode.

A NAFION® (DUPONT Company) polymer membrane was interposed between the resultant electrodes as an anode and a cathode, and hot-pressed at 120° C. for 1 minute to fabricate a membrane-electrode assembly (MEA). The fabricated membrane-electrode assembly was positioned between two sheets of gaskets and then interposed between two separators where gas flow channels and cooling channels having predetermined shapes are formed. The resultant assembly was pressed between copper end plates to fabricate a single cell.

Figure 11:
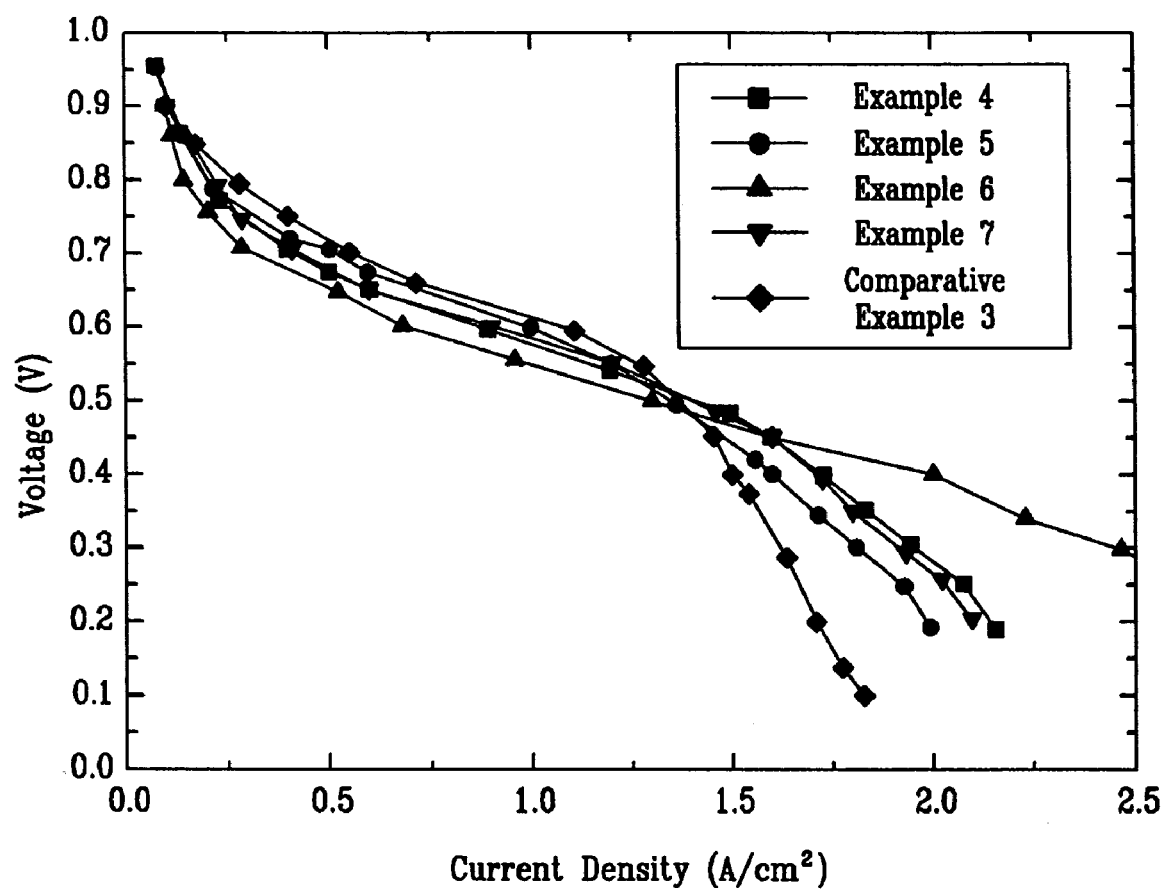
FIG. 11 is a graph showing cell performances of the fuel cells according to Examples 4 to 7 of the present invention and Comparative Example 3.

Hydrogen and air were supplied to the cells according to Examples 4 to 7 and Comparative Example 3 at 60° C. at normal pressure to measure current density and voltage performance of the fuel cells. The measurement results are shown in FIG. 11. As shown in FIG. 11, Examples 4 to 7, including the electrode substrate having hydrophilic channels, showed higher current density compared to Comparative Example 3 at the same voltage. This result is induced from the fact that water generated at the cathode was easily released outside through the hydrophilic channels and thereby water clogging did not occur.

When comparing Examples 4 and 5, as the size of the channels increases, the cell performance, that is current density, is further improved at the same voltage. At high current density, water is generated in a large amount at the cathode to induce cell performance deterioration by water clogging. Therefore, as the hydrophilic channels have larger size, water clogging can be prevented to resultantly obtain high power. When comparing Examples 4 and 6, Example 6 having larger hydrophilic channels also shows improved current density at the same voltage over Example 4.

EXAMPLE 8

Through-holes having a diameter of 500 micrometers were formed by mechanical punching on a carbon paper (BA30, SGL Company). The total area of the through-holes covered up to 30% of the total area of the carbon paper. The carbon paper having through-holes was dipped in a polytetrafluoroethylene emulsion to be water-repellent treated. 10 g (grams) of cellulose fiber as a hygroscopic porous material, 1 g of a cellulose acetate binder, and 100 g of water as a solvent were mixed to prepare a slurry. The slurry was injected into the through-holes and then heat-treatment was performed at 120° C. for 2 hours to remove the solvent. An electrode substrate including cellulose fiber filled into the through-holes was fabricated.

A coating composition for forming a catalyst layer was prepared by mixing 20 parts by weight of platinum supported on a carbon powder (Pt/C, platinum supporting amount: 20 wt %), 10 parts by weight of NAFION® (DUPONT Company), and 70 parts by weight of water. The coating composition was spray-coated on each side of the NAFION® 112 membrane to form catalyst layers.

The membrane was assembled with the electrode substrate to fabricate a membrane-electrode assembly (MEA). The fabricated membrane-electrode assembly was positioned between two sheets of gaskets and then interposed between two separators where gas flow channels and cooling channels having predetermined shapes are formed. The resultant assembly was pressed between copper end plates to fabricate a single cell.

EXAMPLE 9

A single cell was fabricated according to the same method as in Example 8 except that a polyamide fiber was used as the porous hygroscopic material.

EXAMPLE 10

Through-holes having a diameter of 250 micrometers were formed by laser on a carbon paper (BA30, SGL Company). The total area of the through-holes covered up to 30% of the total area of the carbon paper. The carbon paper having through-holes was dipped in a polytetrafluoroethylene emulsion to be water-repellent treated. 10 g of silica as a hygroscopic porous material, 2 g of a cellulose acetate binder, and 100 g of water as a solvent were mixed to prepare a slurry. The slurry was injected into the through-holes and then heat-treatment was performed at 120° C. for 2 hours to remove the solvent. An electrode substrate including porous silica filled into the through-holes was fabricated.

Using the electrode substrate, a single cell was fabricated according to the same method as in Example 8.

COMPARATIVE EXAMPLE 4

A carbon paper without through-holes was dipped in a polytetrafluoroethylene emulsion to be water-repellent treated. Using the carbon paper as an electrode substrate, a single cell was fabricated according to the same method as in Example 4.

Figure 12:
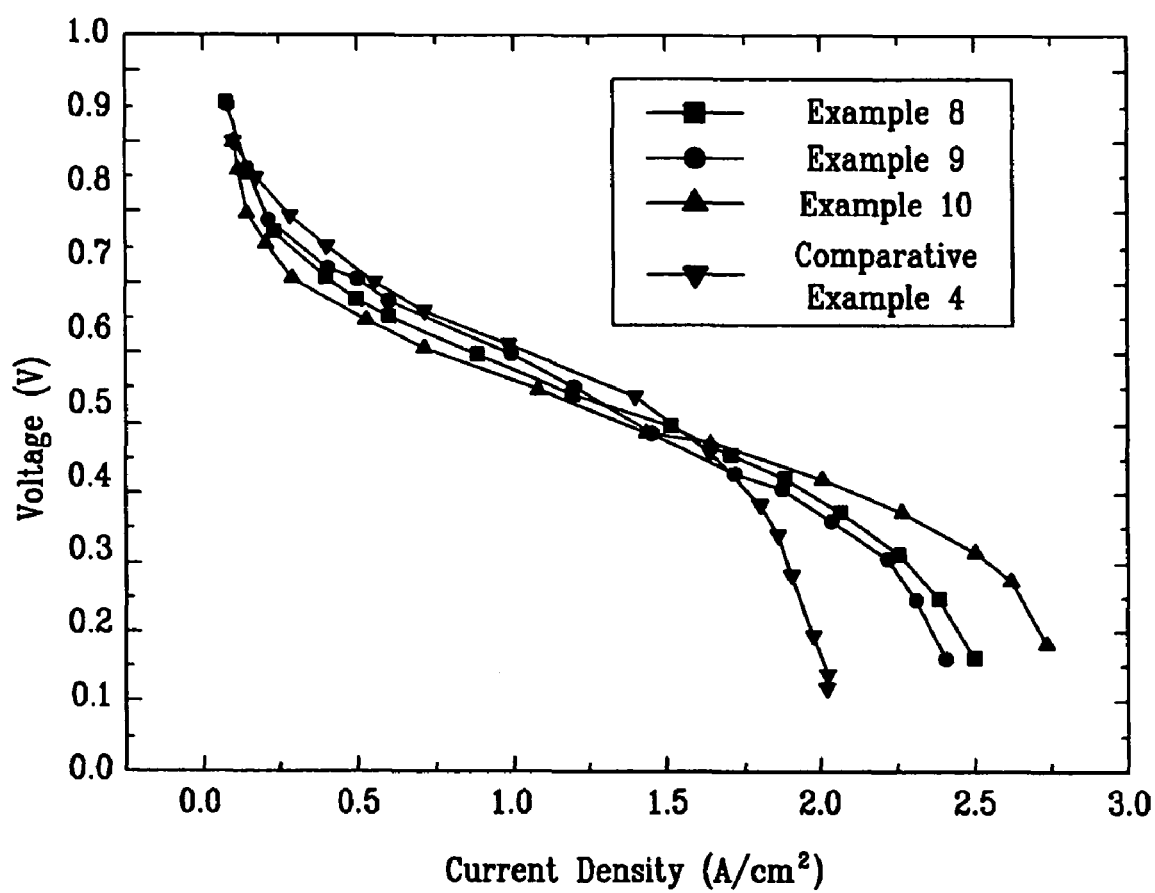
FIG. 12 is graph showing cell performances of the fuel cells according to Examples 8 to 10 of the present invention and Comparative Example 4.

Hydrogen and air were supplied to the cells according to Examples 8 to 10 and Comparative Example 4 at 60° C. at normal pressure to measure current density and voltage performance of the fuel cells. The measurement results are shown in FIG. 12. As shown in FIG. 12, Examples 8 to 10 including the electrode substrate having water releasing passages showed higher current density compared to the Comparative Example 4 at the same voltage. This result is induced from the fact that water generated at the cathode was easily released outside through the water releasing passages and thereby water clogging did not occur and reactants were smoothly diffused.

The electrode substrate of the present invention includes a hydrophilic region and a hydrophobic region separated from each other, whereby water produced at the cathode can be easily released, clogging of pores of the membrane by water can be prevented, and reactants can be smoothly diffused resulting in obtaining a high current density and thus a high power density.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode for a fuel cell comprising:
   a catalyst layer and an electrode substrate supporting the catalyst layer and the electrode substrate comprising two separate regions, (1) a hydrophilic region comprising a hydrophilic material and (2) a hydrophobic region comprising a hydrophobic polymer, wherein the hydrophobic polymer is present in a concentration gradient.

2. The electrode of claim 1, wherein the electrode substrate is selected from the group consisting of carbon paper, carbon cloth, and carbon felt.

3. The electrode of claim 1, wherein the hydrophobic polymer concentration gradient increases in concentration from the surface of the electrode substrate contacting the catalyst layer to the other surface of the electrode substrate.

4. The electrode of claim 1, wherein the hydrophobic polymer is patterned on a surface of the electrode substrate.

5. The electrode of claim 1, wherein the hydrophobic polymer is present on only one side or on each side of the electrode substrate.

6. The electrode of claim 4, wherein the hydrophobic polymer is selected from the group consisting of a fluoro-based polymer, a polyolefin-based polymer, a benzene-containing polymer, and mixtures thereof.

7. The electrode of claim 5, wherein the hydrophobic polymer is selected from the group consisting of poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, poly(ethylene), poly(propylene), poly(isoprene), ethylene propylene monomer, poly(butadiene), polystyrene, polyalphamethylstyrene, and mixtures thereof.

8. The electrode of claim 1, wherein the hydrophilic region comprises a hydrophilic channel for releasing water.

9. The electrode of claim 8, wherein the hydrophobic polymer is selected from the group consisting of a fluoro-based polymer, a polyolefin-based polymer, a benzene-containing polymer, and mixtures thereof.

10. The electrode of claim 9, wherein the hydrophobic polymer is selected from the group consisting of poly(tetrafluoroethylene), a fluoroethylene polymer, poly(vinylidene fluoride), fluorinated ethylene propylene, polychlorotrifluoroethylene, polyhexafluoropropylene polyperfluoro alkylvinylether, polyperfluorosulfonylfluoridealkoxyvinyl ether, poly(ethylene), poly(propylene), poly(isoprene), ethylene propylene monomer, poly(butadiene), polystyrene, polyalphamethylstyrene, and mixtures thereof.

11. The electrode of claim 8, wherein a total area of the hydrophilic channel ranges from and including 5% to and including 50% of the total area of the electrode substrate.

12. The electrode of claim 8, wherein the hydrophilic channel has a size ranging from and including 10 micrometers to and including 1000 micrometers.

13. The electrode of claim 12, wherein the hydrophilic channel has a size ranging from 50 micrometers to 500 micrometers.

14. The electrode of claim 1, wherein the electrode substrate comprises a through-hole and hygroscopic porous materials filled therein.

15. The electrode of claim 14, wherein the hygroscopic porous materials comprise at least one selected from the group consisting of a polymer fiber, a polymer foam, an inorganic oxide, and mixtures thereof.

16. The electrode of claim 15, wherein the polymer fiber comprises at least one selected from the group consisting of cellulose, rayon, cotton, polyester, polyamide, polyvinyl alcohol, polyethyleneoxide, polyhydroxyethylmethylacrylate, copolymers thereof, and mixtures thereof.

17. The electrode of claim 15, wherein the polymer foam comprises at least one selected from the group consisting of polyurethane foam, polycarbonate foam, and mixtures thereof.

18. The electrode of claim 15, wherein the inorganic oxide comprises at least one selected from the group consisting of silica, titania, alumina, zeolite, and mixtures thereof.

19. The electrode of claim 14, wherein the total area of the through-hole ranges from 5% to 50% of the total area of the electrode substrate.

20. The electrode of claim 14, wherein the through-hole has a size ranging from 10 micrometers to 1000 micrometers.

21. The electrode of claim 14, wherein the through-hole has a size ranging from equal to or greater than 50 micrometers to less than or equal to 500 micrometers.

22. A method of preparing an electrode for a fuel cell of claim 4 comprising:
    forming a patterned hydrophobic polymer layer on one surface of an electrode substrate by coating a hydrophobic polymer liquid thereon, wherein the hydrophobic polymer is gasified by heating or plasma-treating to form a layer on the electrode substrate and a portion of the hydrophobic polymer is absorbed into the electrode substrate to form a concentration gradient, and
    forming a catalyst layer on the other surface of the electrode substrate from which the patterned hydrophobic polymer layer is formed.

23. The method of claim 22, wherein the hydrophobic polymer is coated by mounting a mask on the electrode substrate.

24. The method of claim 22, wherein the patterned hydrophobic polymer layer is manufactured by a method comprising:
    coating non-polar materials on the electrode substrate after mounting a mask having a shape corresponding to the channels on the electrode substrate;
    performing water-repellent coating with a hydrophobic polymer after removing the mask; and
    removing non-polar materials by dissolving the non-polar materials with a non-polar solvent.

25. The method of claim 24, wherein the non-polar material is at least one selected from the group consisting of polystyrene, polysiloxane, polyvinylchloride, polyvinylfluoride, polyvinylidenedifluoride, a polyvinylidenedifluoride-hexafluoropropane copolymer, and a mixture thereof.

26. The method of claim 24, wherein the solvent is at least one selected from the group consisting of benzene, acetone, N-methylpyrrolidone, tetrahydrofuran, chloroform, and mixtures thereof.

27. The method of claim 24, further comprising heat treating after or before the non-polar material is removed.

28. A membrane-electrode assembly for a fuel cell comprising:
    a polymer electrolyte membrane; and
    electrodes positioned at each side of polymer electrolyte membrane, wherein the electrodes comprise:
        a catalyst layer, and
        an electrode substrate supporting the catalyst layer, and
    the electrode substrate comprises two separate regions, (1) a hydrophilic region comprising a hydrophilic material and (2) a hydrophobic region comprising a hydrophobic polymer, wherein the hydrophobic polymer is present in a concentration gradient.

29. The membrane-electrode assembly of claim 28, wherein the hydrophobic polymer has a concentration gradient where the polymer concentration increases from the one surface of the electrode substrate contacting the catalyst layer to the other surface of the electrode substrate.

30. The membrane-electrode assembly of claim 28, wherein the electrode substrate comprises a patterned hydrophobic polymer layer on a surface of the electrode substrate.

31. The membrane-electrode assembly of claim 28, wherein the hydrophobic polymer layer is present on at least one side of the electrode substrate.

32. A membrane-electrode assembly for a fuel cell, comprising:
    a polymer electrolyte membrane;
    catalyst layers positioned at each side of the polymer electrolyte membrane; and
    electrode substrates positioned on one surface of each catalyst layer which surface does not contact the polymer electrolyte membrane,
    the electrode substrates comprising two separate regions, (1) a hydrophilic region comprising a hydrophilic material and (2) a hydrophobic region comprising a hydrophobic polymer, wherein the hydrophobic polymer is present in a concentration gradient.

33. The membrane-electrode assembly of claim 32, wherein the hydrophobic polymer has a concentration gradient where the polymer concentration increases from the one surface of the electrode substrate contacting the catalyst layer to the other surface of the electrode substrate.

34. The membrane-electrode assembly of claim 32, wherein the electrode substrate comprises a patterned hydrophobic polymer layer on a surface of the electrode substrate.

35. A fuel cell system, comprising:
    an electricity generating element, comprising:
        a membrane-electrode assembly, comprising:
            a polymer electrolyte membrane; and
            electrodes positioned at each side of the polymer electrolyte membrane,
            wherein the electrodes comprise:
                a catalyst layer, and
                an electrode substrate supporting the catalyst layer, and the electrode substrate comprising two separate regions, (1) a hydrophilic region comprising a hydrophilic material and (2) a hydrophobic region comprising a hydrophobic polymer, wherein the hydrophobic polymer is present in a concentration gradient, and
        separators positioned at each side of the membrane-electrode assembly;
    a fuel supplier; and
    an oxidant supplier.

36. A fuel cell system comprising:
an electricity generating element comprising
a membrane-electrode assembly, comprising:
a polymer electrolyte membrane;
catalyst layers positioned at each side of the polymer electrolyte membrane; and
electrode substrates positioned on one surface of each catalyst layer which surface does not contact the polymer electrolyte membrane,
the electrode substrates comprising two separate regions, (1) a hydrophilic region comprising a hydrophilic material and (2) a hydrophobic region comprising a hydrophobic polymer, wherein the hydrophobic polymer is present in a concentration gradient, and
separators positioned at each side of the membrane-electrode assembly;
a fuel supplier; and
an oxidant supplier.

* * * * *